(12) United States Patent  (10) Patent No.: US 8,702,014 B1
Bullard, III  (45) Date of Patent: Apr. 22, 2014

(54) DRIVE TOWER FOR SELF-PROPELLED IRRIGATION SYSTEM

(76) Inventor: George Edmund Bullard, III, Fayetteville, NC (US)

( * ) Notice: Subject to any disclaimer, the term of this patent is extended or adjusted under 35 U.S.C. 154(b) by 475 days.

(21) Appl. No.: 12/842,309

(22) Filed: Jul. 23, 2010

(51) Int. Cl.
 *A01G 25/09* (2006.01)
(52) U.S. Cl.
 USPC ............... 239/1; 239/728; 239/735; 239/737
(58) Field of Classification Search
 CPC ............................. A01G 25/09; A01G 25/092
 USPC .............................................. 239/723–749, 1
 See application file for complete search history.

(56) References Cited

U.S. PATENT DOCUMENTS

| | | | |
|---|---|---|---|
| 3,599,664 A * | 8/1971 | Hotchkiss et al. | ............ 239/731 |
| 4,230,275 A | 10/1980 | Tidwell | |
| 4,354,637 A | 10/1982 | Tidwell | |
| 4,763,836 A | 8/1988 | Lyle et al. | |
| 5,078,326 A | 1/1992 | Wright | |
| 6,039,273 A | 3/2000 | Christensen | |
| 6,085,999 A | 7/2000 | Gerdes et al. | |
| 6,131,833 A | 10/2000 | Chapman | |
| 6,928,339 B2 | 8/2005 | Barker | |
| 7,229,032 B1 | 6/2007 | Christensen et al. | |
| 7,309,035 B2 | 12/2007 | Korus | |
| 7,311,275 B2 | 12/2007 | Korus | |
| 7,438,243 B1 | 10/2008 | Erickson | |

* cited by examiner

*Primary Examiner* — Christopher Kim
(74) *Attorney, Agent, or Firm* — Coats and Bennett, P.L.L.C.

(57) ABSTRACT

A self-propelled irrigation system includes a drive tower configured to cross over a drainage ditch or other watercourse in an irrigated field without the use of a bridge or other support structure to support the load of the drive tower.

3 Claims, 6 Drawing Sheets

DRIVE TOWER FOR SELF-PROPELLED IRRIGATION SYSTEM

BACKGROUND

The present invention relates generally to agricultural irrigation systems and, more particularly, to an improved drive tower for self-propelled irrigation systems.

Self-propelled irrigation systems are commonly used for irrigation of agricultural lands. Self-propelled irrigation systems typically comprise an elongated pipeline supported by a plurality of spaced-apart drive towers. Sprinklers spaced along the irrigation pipeline spray water as the drive towers move the irrigation pipeline over the land. In center-pivot irrigation systems, the irrigation pipeline extends radially from a center pivot, and the drive towers move in a circle about the center pivot. In lateral move irrigation systems, the drive towers move in a straight line in a direction lateral to the irrigation pipeline.

The drive towers for self-propelled irrigation systems typically comprise a generally-triangular frame with an elongated base beam extending transverse to the irrigation pipeline. In the most common designs, wheels are disposed at opposite ends of the base beam. In some designs, additional wheels may be disposed between the ends of the base beam. To prevent the drive tower from tipping over or getting stuck, the path traveled by the drive tower needs to be relatively uniform.

On some farms, the fields being irrigated may be traversed by one or more drainage ditches, irrigation ditches, streams, or water courses. The ditches may be too wide for a traditional drive tower to cross. Consequently, bridges or culverts may need to be installed at points where the drive towers cross the ditches. In some installations, hundreds of bridges may be needed for irrigation of a single field. The cost of the bridges adds significantly to the cost of the irrigation system, which is an impediment to the adoption of self-propelled irrigation systems. Also, the bridges can interfere with tractors, other equipment, and drainage.

SUMMARY

The present invention relates to an improved drive tower for a self-propelled irrigation system having the ability to cross drainage ditches without the need for bridges. The drive tower comprises a frame with an elongated base beam extending in a direction transverse to the irrigation pipeline. The elongated beam is typically several times longer than the beams in conventional drive towers and is designed to cantilever over ditches as the drive tower crosses the ditches. A pair of outer wheels are disposed at opposing ends of the base beam. A pair of inner wheels are disposed in a center portion of the base beam between the outer wheels. Each outer wheel is spaced from the nearest inner wheel so that the outer wheel can make contact with the ground on one side of the drainage ditch while the nearest inner wheel remains in contact with the ground on the opposite side of the drainage ditch. In one exemplary embodiment, the distance between the outer wheels and the nearest inner wheel is greater than the distance between the inner wheels. For crossing large drainage ditches, the distance from the outer wheels to the nearest inner wheels is preferably more than twice the distance between the inner wheels, and in some embodiments may be more than 3 times the distance between the inner wheels.

When the drive tower crosses a ditch, the outer wheel on the leading end of the drive tower will initially cantilever over the ditch until the wheel contacts the ground on the opposite side of the ditch. While the leading wheel is cantilevered, the weight of the drive tower is supported by the other three wheels. As the drive tower continues to move forward, the inner wheels pass over the top of the ditch, while the outer wheels remain in contact with the ground on opposing sides of the ditch. When the inner wheels have reached the opposing side of the ditch, the outer wheel on the trailing end of the drive tower will then cantilever over the ditch with the weight of the drive tower supported by the other three wheels. Thus, the drive tower will always be supported by two or three wheels during the crossing. The spacing of the wheels and the weight distribution of the drive tower prevents the leading and/or trailing ends of the drive tower from tipping down into the ditch during the crossing.

DETAILED DESCRIPTION

Figure 1:
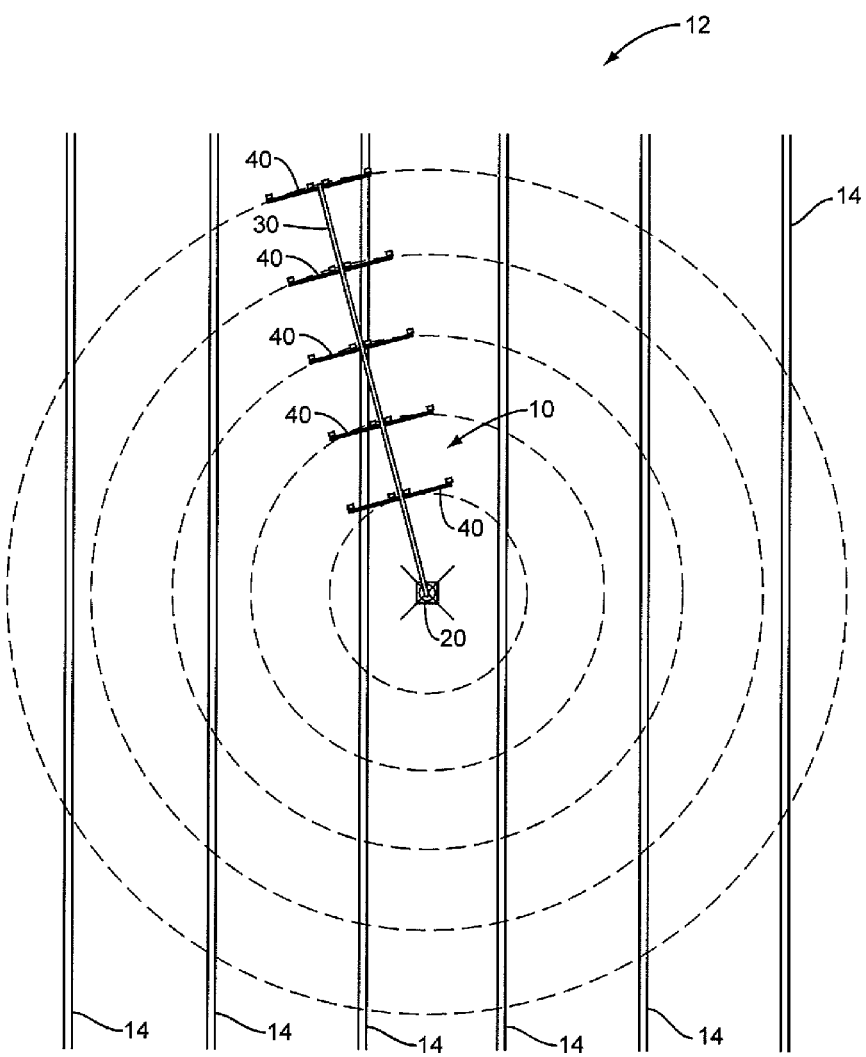
FIG. 1 is a top plan view of a center-pivot irrigation system according to the present invention.

Referring now to the drawings, a self-propelled irrigation system 10 according to one embodiment of the present invention is illustrated. While the illustrated embodiment is a center-pivot irrigation system, those skilled in the art would well appreciate that the present invention may also be applied to a lateral-move irrigation system or other type of self-propelled irrigation system.

Figure 2:
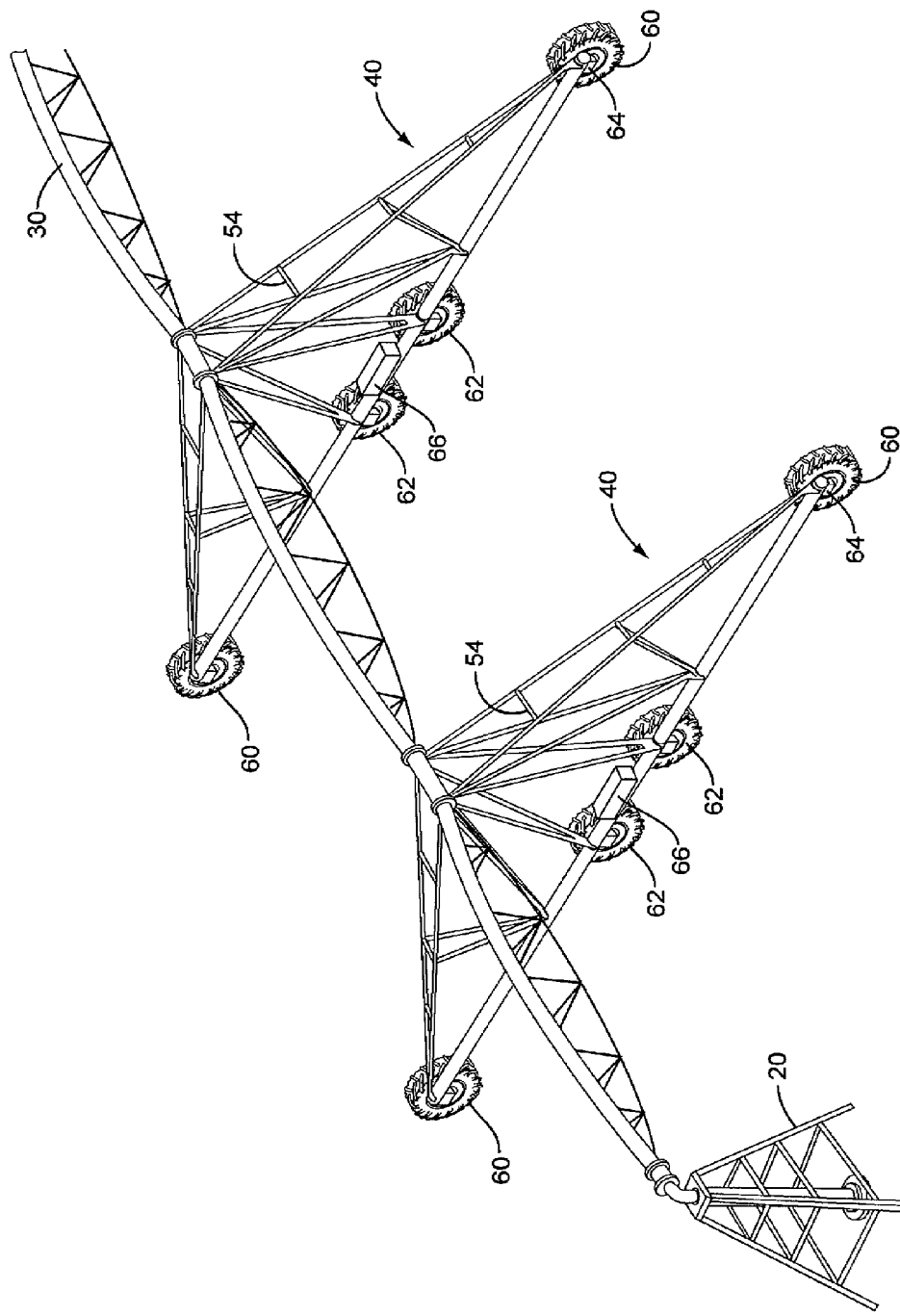
FIG. 2 is a perspective view of the center-pivot irrigation system according to one embodiment of the invention.

FIG. 1 illustrates the irrigation system 10 in a field 12 having a series of drainage ditches 14 that extend in parallel across the field 12. FIG. 2 illustrates in perspective the main functional components of the irrigation system 10. The irrigation system 10 includes a center-pivot structure 20, an irrigation pipeline 30, and a series of drive towers 40. The irrigation pipeline 30 extends radially-outward from the center pivot structure 20 and is supported at spaced-apart locations by the drive towers 40. The drive towers 40 are self-propelled structures that move the irrigation pipeline 30 in a circular path around the center-pivot structure 20 as shown in FIG. 1.

Figure 3:
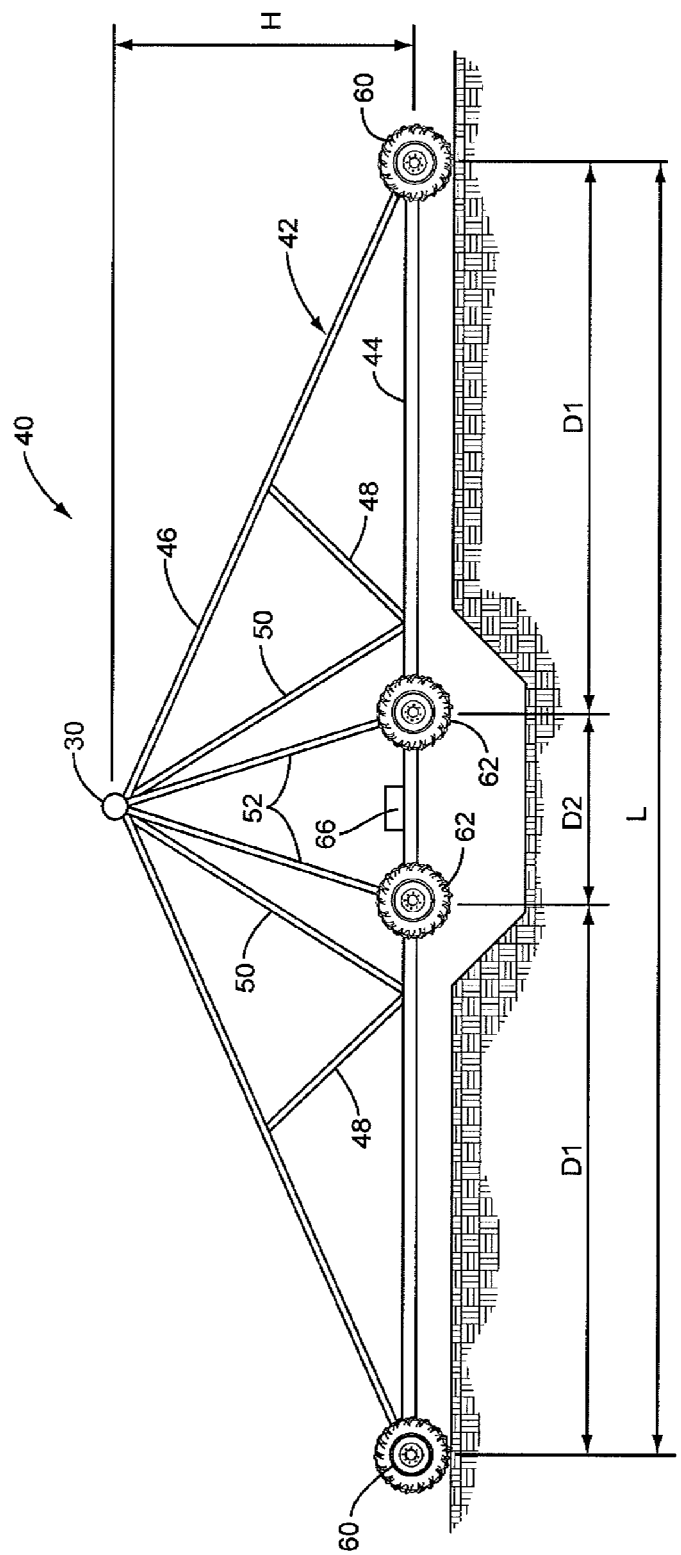
FIG. 3 is an elevation view of a drive tower for the center-pivot irrigation system according to one embodiment of the invention.

FIG. 3 illustrates an exemplary drive tower 40 according to one embodiment of the present invention. The drive tower 40 resembles a truss with wheels. The drive tower 40 includes a generally triangular frame 42 supported on wheels 60, 62. The frame 42 comprises a base beam 44 that extends transversely to the irrigation pipeline 30. Frame members 46 extend upwardly at an angle from respective ends of the base beam 44 and meet at the top of the drive tower 40. Struts 48, 50, and 52 interconnect the base beam 44 and the frame members 46 at various points to form a truss and to provide strength and rigidity to the frame 42. Cross members 54 interconnect the frame members 46 to provide lateral stability. Other frame members (not shown) may be used as needed to provide strength and rigidity for crossing ditches as will be hereinafter described.

The drive tower 40, as previously noted, is supported by wheels 60, 62 that roll on the ground. More specifically, the drive tower 40 includes a pair of outer wheels disposed at opposing ends of the base beam 44 and a pair of inner wheels 62 that are disposed close to the center of the base beam 44. As used herein, the term inner wheels refer to the wheels closest to the midpoint of the base beam 44. Each of the wheels 60, 62 mounts to a gear box 64, which is connected by a drive shaft (not shown) to a drive motor 66. As shown in FIG. 2, the wheels 60, 62 may be mounted to follow a straight line parallel to the base beam 44. However, in the case of the drive towers 40 closest to the center-pivot structure 12, the wheels 60, 62 and corresponding gear boxes 64 may be mounted at a slight angle to make it easier for the drive tower 40 to follow a tighter circle. Those skilled in the art will appreciate that the drive tower could include additional wheels (not shown) and is not limited to four wheels. For example, another pair of wheels could be placed between the outer wheels 60 and inner wheels 62. Also, a wheel could be located at the center of the elongated base beam 44.

According to the present invention, the drive tower 40 is configured to give the drive tower 40 the inherent ability to cross over drainage ditches 14 in an irrigated field 12 without the need for bridges spanning the drainage ditches 14. Drainage ditches 14 in irrigated fields 12 are typically several feet deep and 8 feet or more in width. The drive tower 40 will not always cross the ditch 14 on a perpendicular path. As shown in FIG. 1, the drive tower 40 may cross some drainage ditches at a sharp angle (e.g. 60 degrees from perpendicular or more). Therefore, the drive towers 40 need to be able to cross a distance much greater than the width of the drainage ditch 14. For example, when the drive tower 40 crosses a ditch at an angle of 60 degrees from perpendicular, the actual distance from one side of the ditch 14 at the angle of approach is twice the width of the ditch 14. If the ditch 14 is 8 foot wide, the distance from one side to the other on the path followed by the drive tower 14 will be 16 feet.

The length of the base beam 44 and the spacing of the wheels 60, 62 along the base beam 44 are important factors in designing a drive tower 40 with the ability to cross over drainage ditches 14. The basic idea is to increase the length of the drive tower and increase the distance between each outer wheel and the nearest inner wheel 62 such that the outer wheel 60 and inner wheel 62 may contact the ground on opposing sides of the drainage ditch 14. In one exemplary embodiment, the overall length L of the frame is several times greater than the height H. In a preferred embodiment, the length L of the frame 42 is at least 3 times the height H, and more preferably at least 3.5 times the height. The distance between the outer wheel 60 and nearest inner wheel is labeled D1 in FIG. 3. The distance D1 between outer and inner wheels 60, 62 is preferably greater than the distance D2 between the inner wheels. Typically, the distance D1 is at least twice the distance D2 and may exceed three times the distance D2. The distance D1 is the maximum distance that the drive tower 40 can cross without a bridge. The length L of the frame 42 enables the drive tower 40 to cantilever over a drainage ditch and the ratio of the length L to the height H reduces the tendency of the drive tower 40 to tip down into the ditch.

The present invention enables deployment of self-propelled irrigation systems 10 in fields having drainage ditches of up to 19 feet in width or more. In one exemplary embodiment of the invention, the base beam of the drive tower 40 is approximately 45 feet in length and the distance D1 between outer and inner wheels 60, 62 is approximately 19 feet. The distance D2 between the inner wheels 62 is approximately 7 feet. With these dimensions, the drive tower 40 is able to cross a drainage ditch approximately 9½ feet wide at an angle of up to approximately 60° from perpendicular. It will be appreciated by those skilled in the art that the ability to cross distances greater than the width of the ditch is necessary because the drive tower 40 may not always cross the drainage ditches 14 on a perpendicular path. For most practical applications, the drive tower 40 needs to span a distance up to twice the width of the drainage ditch 14 in order to cross the drainage ditch at angles of up to 60° from perpendicular.

Figure 4A:
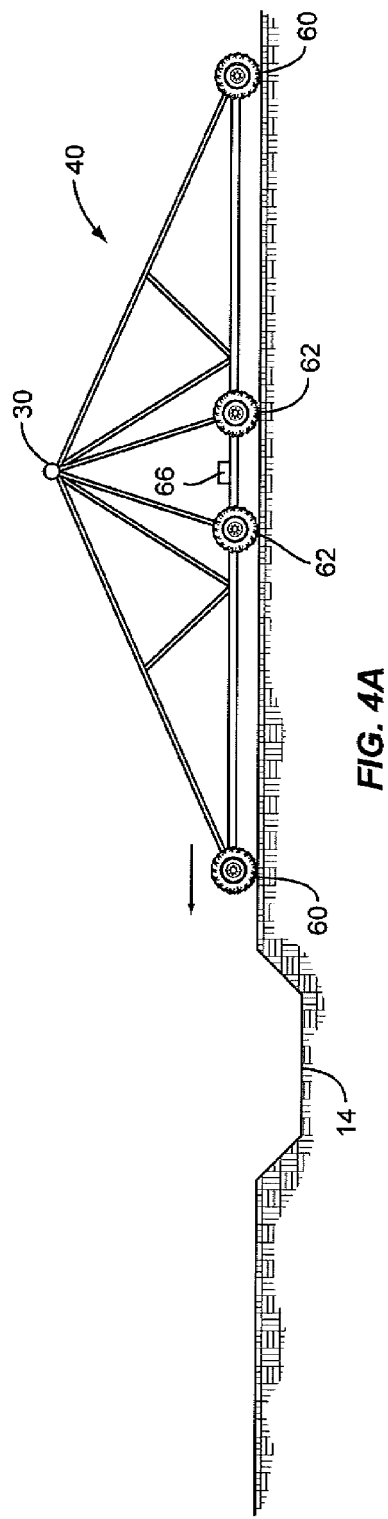
FIGS. 4A-4E illustrate the drive tower crossing a drainage ditch in an irrigated field.
Figure 4B:
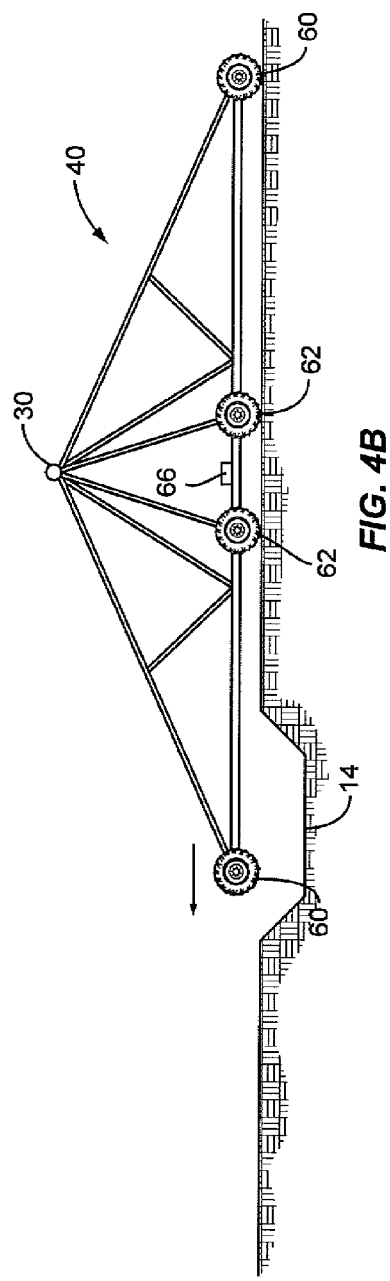
Figure 4C:
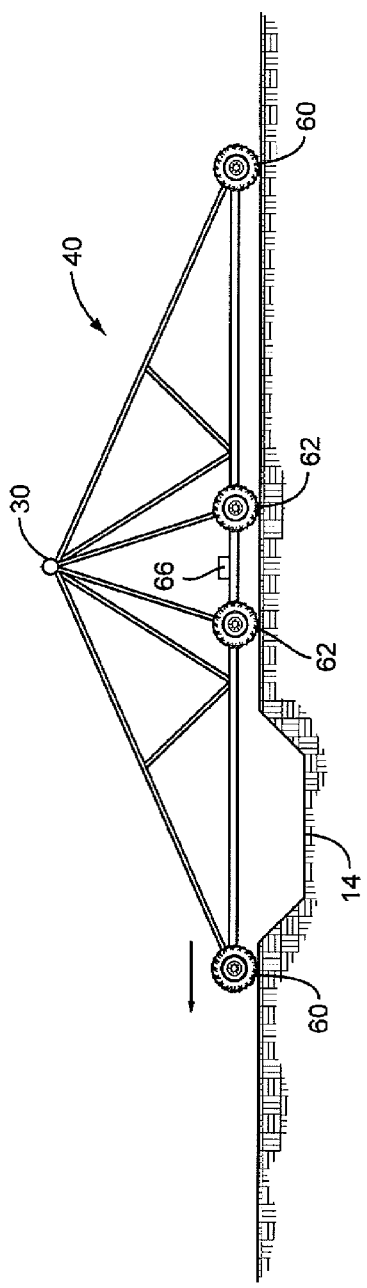

FIGS. 4A-4E illustrate how the drive tower 40 is able to cross over the drainage ditch 14 in an irrigated field. FIG. 4A illustrates the drive tower 40 approaching a drainage ditch 14. The arrow in FIG. 4A illustrates the direction of travel. At this point, all four wheels 60, 62 are on the ground on the near side of the drainage ditch 14. In FIG. 4B, the drive tower 40 has moved forward so that the outer wheel 60 on the leading end of the drive tower 40 cantilevers over the drainage ditch 14. It should be noted that, when the outer wheel 60 on the leading end of the drive tower 40 is cantilevered, the remaining three wheels 60, 62 remain in contact with the ground on the near side of the drainage ditch 14. FIG. 4C shows the outer wheel 60 on the leading end of the drive tower 40 making contact with the ground on the far side of the drainage ditch 14. The point to note here is that the inner wheel 62 on the leading side of the drive tower 40 is still in contact with the ground on the near side of the drainage ditch 14.

Figure 4D:
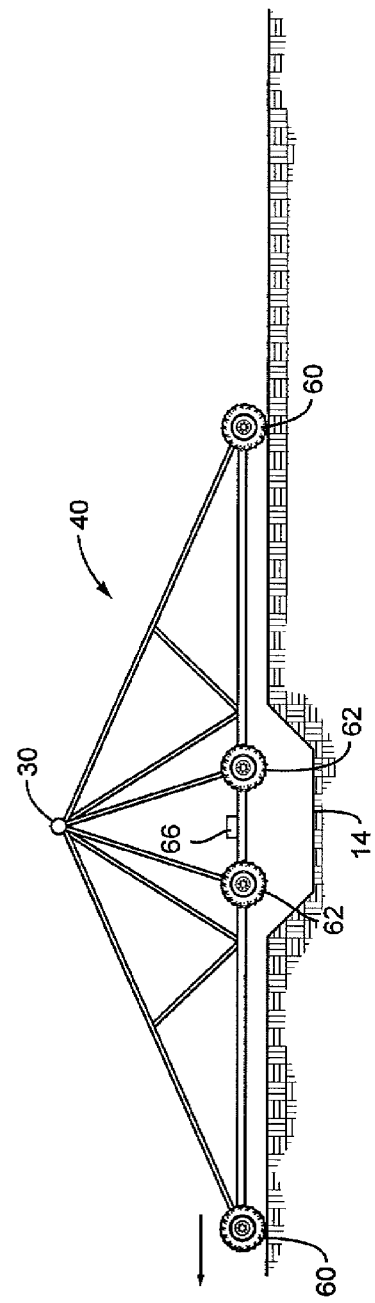
Figure 4E:
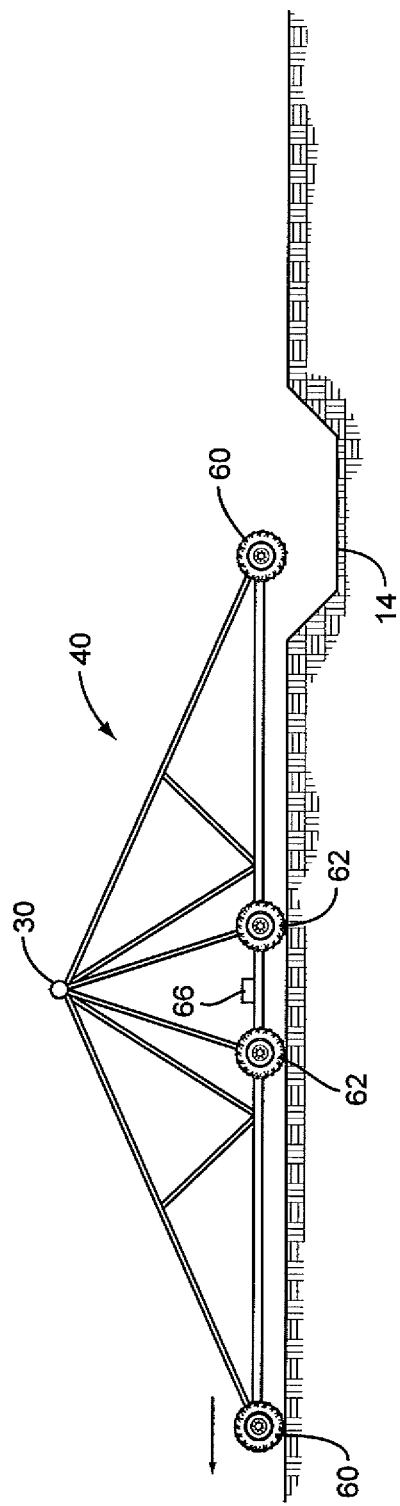

In this example, it is presumed that the distance D2 between the inner wheels 62 is less than the width of the drainage ditch 14. Therefore, the two inner wheels 62 will be suspended over the drainage ditch as shown in FIG. 4D as the drive tower 40 continues to move forward. Finally, as shown in FIG. 4E, when the two inner wheels 62 make contact with the ground on the far side of the drainage ditch 14, the outer wheel 60 on the trailing end of the drive tower 40 will cantilever over the drainage ditch 14. During the crossing, at least two wheels 60, 62 remain in contact with the ground at all times. The spacing of the wheels 60, 62 and the weight distribution prevent the drive tower 40 from tipping into the ditch 14, as would be the case with conventional drive towers.

The drive tower 40 according to the present invention significantly reduces cost of an irrigation system 10 by eliminating the need to install bridges at points where the drive tower 40 crosses over the drainage ditches 14. Thus, the present invention should facilitate the deployment and use of irrigation systems in fields 12 with drainage ditches 14 or other water courses, which in turn, will result in greater yields.

What is claimed is:

1. A method of crossing a drainage ditch at least 8 feet in width with a drive tower for a self-propelled irrigation system, said drive tower comprising a support frame including a base beam with a pair of outer drive wheels disposed on opposing end portions of the base beam and a pair of inner drive wheels disposed between the outer drive wheels, said method comprising:

moving the drive tower in a forward direction;

while moving the drive tower forward, cantilevering the outer drive wheel on a leading end of the drive tower over the ditch;

while moving the drive tower forward, contacting the ground on a far side of the ditch with the outer drive wheel on the leading end of the drive tower while the inner drive wheel nearest the leading end of the drive tower remains in contact with the ground on a near side of the ditch;

while moving the drive tower forward, contacting the ground on the far side of the ditch with the inner drive wheel nearest a trailing end of the drive tower while the outer drive wheel on the trailing end of the drive tower remains in contact with the ground on the near side of the ditch;

while moving the drive tower forward, cantilevering the outer drive wheel on the trailing end of the drive tower over the ditch; and continuing to move the drive tower forward until both outer drive wheels have made contact with the ground on the far side of the ditch.

2. The method of claim 1 wherein the width of the ditch is greater than a distance between the inner drive wheels and further comprising suspending both inner drive wheels over the ditch while the outer drive wheels are in contact with the ground on on the near and far sides of the ditch respectively.

3. The method of claim 1 wherein crossing the drainage ditch comprises crossing the drainage ditch at an angle of approximately 60 degrees from a line perpendicular to the drainage ditch.

\* \* \* \* \*